United States Patent [19]
Ritter et al.

[11] Patent Number: 4,867,197
[45] Date of Patent: Sep. 19, 1989

[54] HIGH PRESSURE VALVE

[75] Inventors: Andrew M. Ritter, Audubon; John S. Fetterolf, Royersford; James W. Williams, 3rd, Gwynedd, all of Pa.

[73] Assignee: Fetterolf Corporation, Skippack, Pa.

[21] Appl. No.: 311,473

[22] Filed: Feb. 15, 1989

[51] Int. Cl.⁴ ............................................. F16K 43/00
[52] U.S. Cl. .................................. 137/315; 251/171; 251/174; 251/214; 251/324; 277/106
[58] Field of Search .................. 137/315, 454.2, 454.5, 137/454.6; 251/62, 63, 214, 318, 319, 322, 323, 324, 171, 174, 176, 326, 327, 328, 329; 277/105, 106

[56] References Cited

U.S. PATENT DOCUMENTS

| | | | |
|---|---|---|---|
| 843,320 | 2/1907 | McCarthy | 277/106 |
| 2,734,714 | 2/1956 | Knox | 251/171 |
| 2,757,896 | 8/1956 | Sangster | 251/176 |
| 3,474,818 | 10/1969 | Hartman | 137/315 |
| 3,559,951 | 2/1971 | Whiteman, Jr. | 251/214 |
| 3,659,862 | 5/1972 | Sebestian | 277/106 |
| 4,374,583 | 2/1983 | Barrington | 251/324 |
| 4,469,123 | 9/1984 | Merrill | 137/315 |
| 4,600,032 | 7/1986 | Heyl | 137/315 |

OTHER PUBLICATIONS

Bulletin RS-87A, Fetterolf Corporation.

*Primary Examiner*—George L. Walton
*Attorney, Agent, or Firm*—Richard D. Weber

[57] ABSTRACT

An arrangement for providing access to the seal rings of a seatless high pressure valve includes an aperture in the valve body and a demountable sealed closure for the aperture. The sleeve within the valve body for transmitting the gland force to the seal rings is made in segments small enough for removal through the aperture to permit access to the seal rings. The valve seal rings may accordingly be replaced without disassembly of the major valve components including the valve plunger and gland.

18 Claims, 3 Drawing Sheets

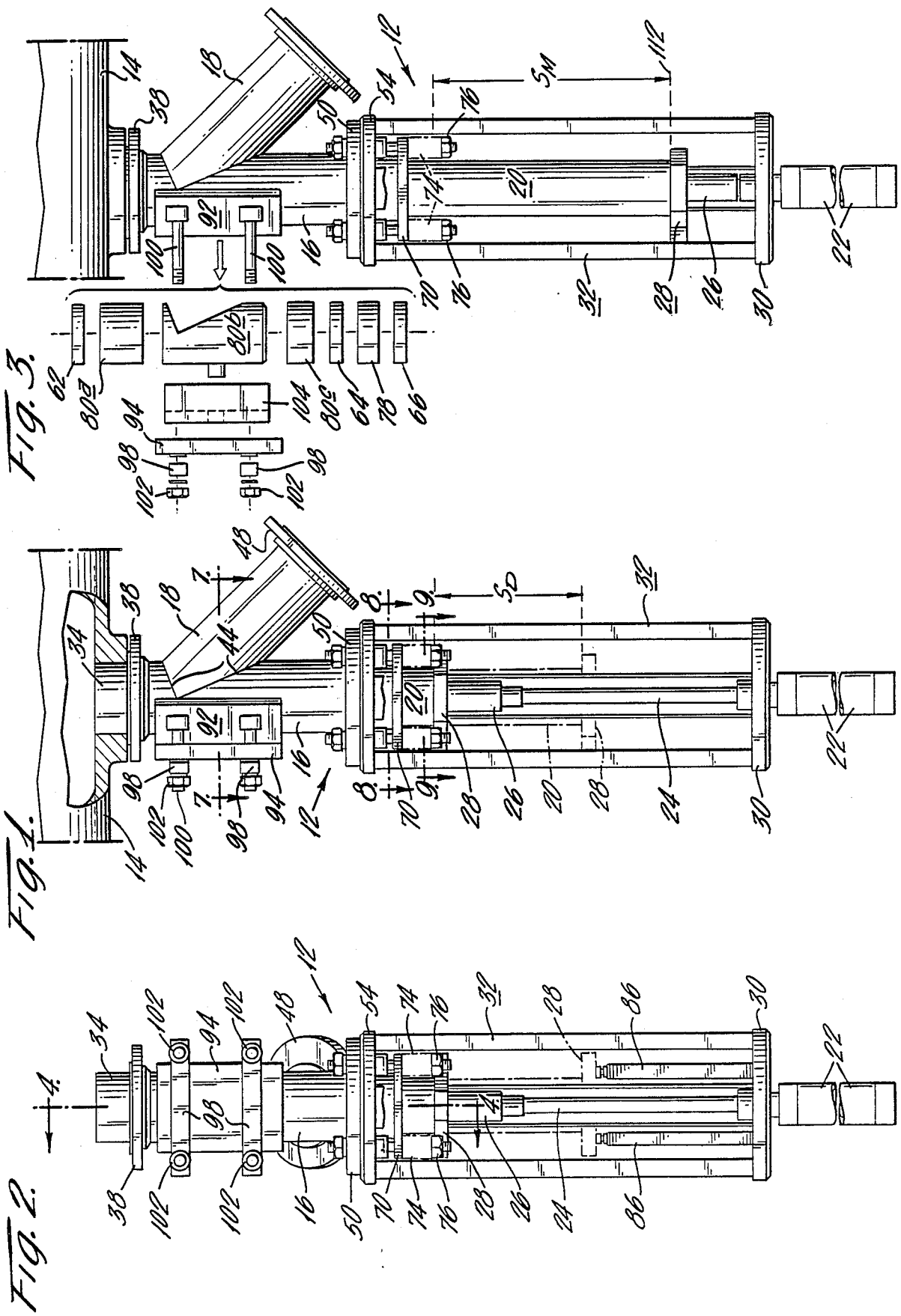

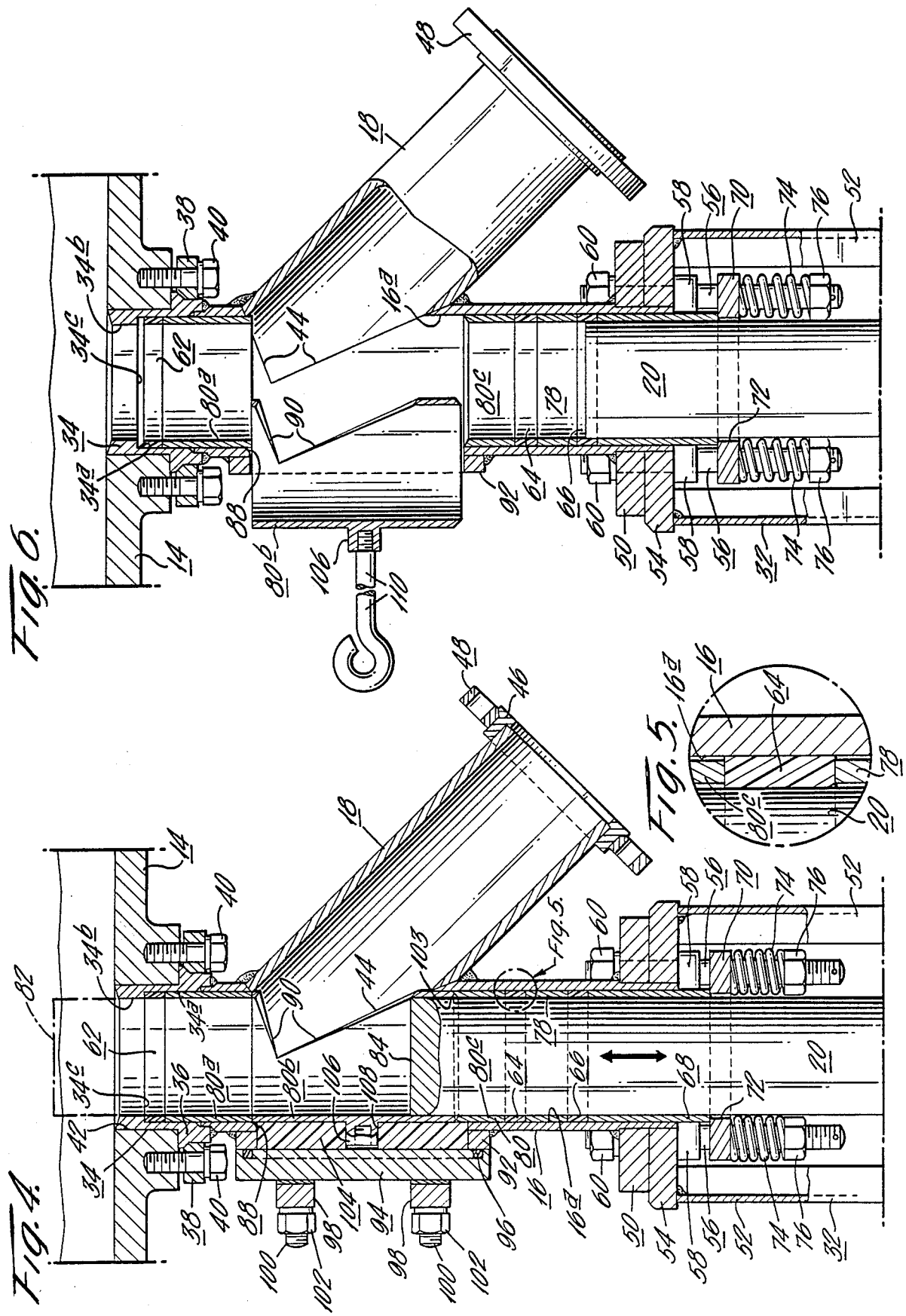

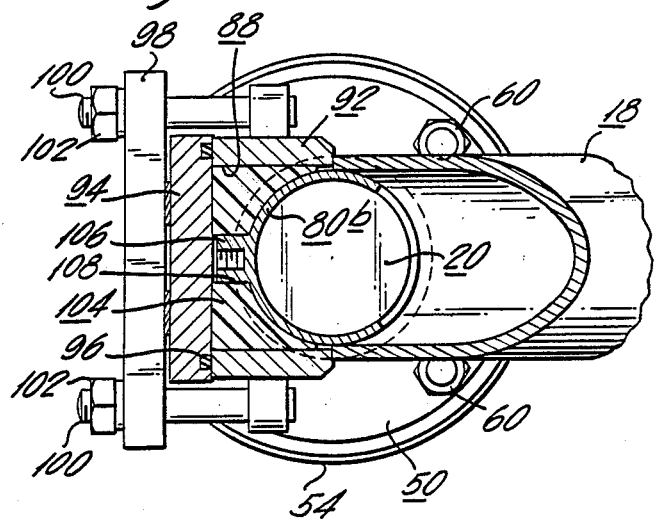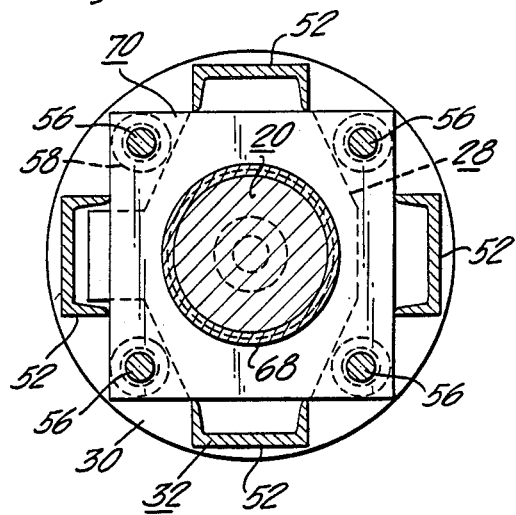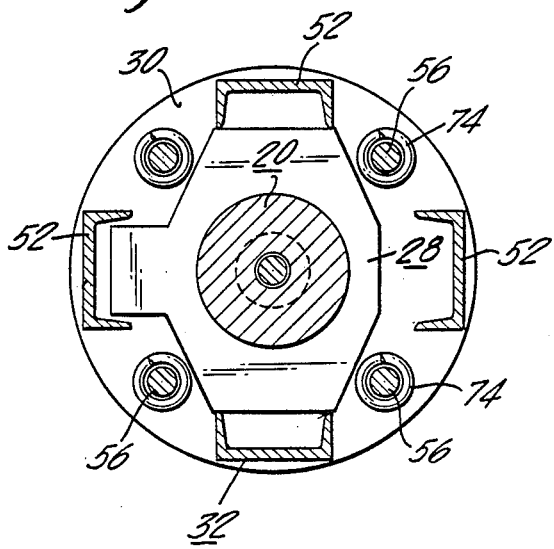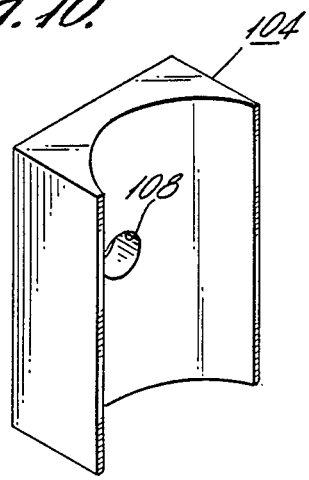

HIGH PRESSURE VALVE

FIELD OF THE INVENTION

The present invention relates generally to high pressure valves of the seatless type comprising spaced seal rings within a valve body encircling a plunger and having a gland for maintaining the rings in resilient sealing engagement with the plunger and valve body. The invention relates more particularly to improvements in such valves providing access to the seal rings for inspection or replacement of the rings without dismantling of the major components of the valve.

BACKGROUND OF THE INVENTION

High pressure valves, particularly those used in the chemical industry, are often subjected to extremely high pressure and temperature conditions. The seal rings used in certain types of such valves consequently may have a relatively short life and may have to be replaced at frequent intervals. One such valve is the so called "seatless" valve characterized by a plunger moving past an inner seal ring on closure to prevent valve clogging or plugging. In a conventional high pressure seatless valve, the inner and outer seal rings are maintained in resilient sealing engagement with the plunger and the valve body by means of a spring-loaded gland bearing against the outer seal. A sleeve extending between the inner and outer seal rings transmits the gland force to the inner seal ring.

When the seal rings of a conventional seatless valve require replacement, the valve must be completely disassembled, a laborious process which may take several days to complete. The plunger and gland must be removed to permit access to and removal of the outer seal ring, following which the sleeve and inner seal ring can be removed. Since the larger size valves may weigh several thousand pounds, disassembly in the field can be an ordeal. In some cases, the residue from fluids which have passed through the valves causes the valve parts to stick together, complicating disassembly and causing further delays in returning the valves to service.

SUMMARY OF THE INVENTION

The improvement of the present invention permits access to and replacement of seatless high pressure valve seal rings within the valve body without the need for removing the valve plunger or gland. An access aperture is provided in the wall of the valve body between the inner and outer seal rings, and the guide sleeve comprises a plurality of sleeve segments sized to pass through the aperture. Closure means are provided to seal the aperture during use of the valve. In order to replace the seal rings, the plunger is retracted to a maintenance position exposing the outer seal ring, and the gland force is released. Opening of the closure means permits the removal of the guide sleeve segments and the seal rings. New seal rings are installed, the sleeve segments replaced and the closure means reinstalled. Gland force is then restored, and the plunger returned to its normal position to ready the valve for service.

It is accordingly a primary object of the invention to provide an improved seatless high pressure valve construction which permits the replacement of the valve seal rings without disassembly of major components of the valve.

A further object of the invention is to provide an improved valve construction as described which is relatively simple in structure and can be utilized by relatively unskilled workers to effect seal ring changes in the field.

Another object of the invention is to provide an improved valve construction as described which provides better access to the valve seal rings than heretofore available by removal of the valve plunger.

A still further object of the invention is to provide an improved valve construction as described which can be economically constructed and which does not interfere with any valve functions.

Additional objects and advantages of the invention will be more readily apparent from the following description of a preferred embodiment thereof.

BRIEF DESCRIPTION OF THE DRAWINGS

FIG. 1 is a side elevational view of a high pressure valve in accordance with the present invention shown mounted on the bottom of a pressure vessel and with the valve plunger in the closed position;

FIG. 2 is a front elevational view of the valve shown in FIG. 1;

FIG. 3 is a view similar to FIG. 1, but with the valve plunger in a lowered maintenance position and showing in exploded format the removed seal components;

FIG. 4 is an enlarged partial sectional view of the valve taken along line 4—4 of FIG. 2 but with the valve shown in the open position;

FIG. 5 is an enlarged view of the circled portion of FIG. 4;

FIG. 6 is a view similar to FIG. 4 showing the valve during removal of one of the sleeve segments;

FIG. 7 is an enlarged sectional view taken along line 7—7 of FIG. 1;

FIG. 8 is an enlarged sectional view taken along line 8—8 of FIG. 1;

FIG. 9 is an enlarged sectional view taken along line 9—9 of FIG. 1; and

FIG. 10 is a perspective view of the valve body aperture filler block.

DESCRIPTION OF THE PREFERRED EMBODIMENT

Referring to the drawings and particularly FIGS. 1-3 thereof, a high pressure valve assembly 12 in accordance with the invention is shown mounted on the bottom of a pressure vessel 14 to permit selective withdrawal of the fluid contents of the vessel. The valve assembly illustrated, aside from the improvements of the invention as specifically described below, is essentially a conventional high pressure flush bottom valve such as that sold under the trademark ROD-SEAL by Fetterolf Corporation, of Skippack, Pa.

The valve 12 in general includes a substantially cylindrical valve body 16 from which angularly extends a branch portion 18 through which fluids pass to or from the vessel 14 by way of the valve body. A cylindrical valve plunger 20 disposed within the valve body 14 controls flow into the branch portion by selective movement between a raised closed position and a lowered open position. Means are provided for selectively positioning the plunger 20, said means in the illustrated valve comprising a fluid cylinder 22 operatively connected by cylinder rod 24 to a plunger drive rod 26 extending downwardly from a crosshead 28 attached to the lower end of the plunger. The cylinder 22 is mounted on bottom plate 30 of a yoke 32 extending downwardly from the valve body 14. Other means could alternatively be employed for positioning the plunger, such as a hand wheel or electric motor.

Referring to the enlarged sectional view of FIG. 4, the valve body 16 comprises a smooth-walled cylindrical bore 16a within which the plunger 20 is disposed in closely spaced relation. The end of the valve body connected to the pressure vessel 14 includes a welded valve body extension 34 having a bore portion 34a of the same diameter as the valve body bore 16a and serving as a continuation of the valve body bore, and a smaller diameter bore portion 34b closely fitting the plunger but permitting sliding plunger movement therethrough. An outwardly extending flange 36 of the extension 34 cooperatively engages a rotatable mounting ring 38 through which bolts 40 pass to secure the valve to the tank in a secure, sealed manner. The valve body extension 34 extends into the tank outlet port 42 in flush relation with the bottom of the tank.

The branch portion 18 comprises a cylindrical tube of substantially the same diameter as the valve body 16. The branch portion intersects the valve body at substantially a 45° angle along a line of intersection 44. A flanged extension ring 46 on the outer end of the branch portion 18 cooperates with a rotatable bolt ring 48 for connection of the branch portion to the fluid system piping.

An annular stud mounting plate 50 encircles the valve body 16 near the lower end thereof and is welded to the valve body. The yoke 32 comprises four channel members 52 as shown in FIGS. 8 and 9 and an annular top plate 54 welded to the upper ends of the members 52. The top plate 54 fits around the lower end of the valve body 16 and is held against the plate 50 by studs 56 which pass through spaced holes in the yoke top plate 54 and the stud mounting plate 50. The studs 56 include enlarged central shoulders 58 and are threaded on both ends. The shoulders 58 engage the underside of the yoke top plate 54 and the nuts 60 on the upper ends of the studs secure the yoke assembly to the plate 50 and hence the valve body.

In order to prevent fluid leakage between the plunger and the valve body, resilient seal rings are provided above and below the intersection of the branch portion 18 with the valve body. An inner seal ring 62 is disposed at the upper end of the valve body bore and means are provided for preventing axial upward movement of the seal ring 62. This means comprises the reduced diameter portion 34b of the valve body extension 34, the seal ring being disposed against the shoulder 34c formed by the reduced diameter portion 34b. One or more outer seal rings are disposed below the intersection 44 of the valve body with the branch portion 18. In the embodiment illustrated, a pair of outer seal rings 64 and 66 are disposed in spaced relation below the intersection 44.

Means are provided for continuously biasing the inner and outer resilient seal rings to urge them into resilient sealing engagement with the plunger and the valve body. The biasing means comprises a sleeve-shaped gland 68 disposed between the plunger and the lower end of the valve body bore, the lower end of the gland extending from the valve body and bearing against the rectangular gland flange 70 which has a central bore 72 to permit free movement of the plunger therethrough. The gland flange 70, as shown in FIG. 8, includes bores at the corners thereof to permit free sliding movement of the flange along the studs 56. Compression coil springs 74 disposed around the studs 56 beneath the gland flange 70 bear against nuts 76 on the threaded lower ends of the studs and accordingly bias the gland flange 70 and hence the gland 68 upwardly against the lower seal ring 66. In order to transmit the spring-generated gland force to the lower seal ring 64 and the upper seal ring 62, additional sleeve elements are conventionally provided, a first such sleeve 78 being provided between the seal rings 66 and 64, and a second sleeve 80 being provided between the outer seal ring 64 and the inner seal ring 62. An opening is required in the sleeve 80 having the shape of the intersection 44 to prevent obstruction of the flow path between the valve body and the branch portion 18.

The valve operation is straightforward, the fluid cylinder 22 being actuated by suitable controls (not shown) to move the plunger between a closed position shown in broken lines at 82 in FIG. 4 and an open position shown in solid lines in FIG. 4 at 84. The plunger opening stroke is shown as distance $S_d$ in FIG. 1. In the open position, the plunger crosshead 28 bears against stops 86 extending upwardly from the yoke bottom plate 30 as shown in broken lines in FIG. 2. The opening of the plunger permits the fluid flow between the vessel 14 and the branch portion 18 through the valve body portion evacuated by the withdrawn plunger. The outer seals 64 and 66 prevent fluid leakage between the plunger and the valve body in the open position of the plunger. In the closed position of the plunger, the upper seal 62 encircles the plunger, the upper end of which extends inwardly of the seal. In the illustrated embodiment, the closed plunger position extends above the bottom of the tank although alternatively the plunger end could be flush with the tank bottom in the closed valve position.

To augment the biasing force of the gland upon plunger closure, the crosshead 28 maY engage the gland flange 70 in the closed plunger position by means of suitable blocks disposed between the crosshead and gland flange and accordingly further compress the resilient inner and outer seal rings. Such additional gland loading is automatically released upon opening of the plunger.

The valve structure thus far described and the functioning of the valve is conventional. The difficulty of replacing the inner and outer seal rings in such a conventional valve can be appreciated. Not only must the plunger be removed from the valve body, but the gland springs, gland flange and gland must also be removed before the seal rings and sleeves can be reached. Such seal ring replacement can often take a crew of workers several days to effect a change of seal rings, during which time the valve as well as the apparatus served by the valve is out of service. Accordingly, not only is the cost of labor in replacing the seal rings involved, but a much larger cost in terms of idle processing equipment is usually involved as well.

The improvement of the present invention comprises the provision of an aperture 88 in the wall of the valve body 16 in a region of the valve body between the inner and the outer seal rings. Preferably, the aperture is disposed diametrically opposite to the intersection 44 of the valve body 16 and branch portion 18. The aperture 88 has·a circumferential extent of at least 180° and preferably has an axial dimension greater than that of the intersection 44. The sleeve 80 extending between the inner seal ring 62 and outer seal ring 64 is, in the improvement of the invention, comprised of a plurality of sleeve segments, each of which has an axial dimension smaller than that of the aperture 88 to permit the removal of each segment through the aperture to gain access to and replace the seal rings.

In the preferred embodiment illustrated, the guide sleeve 80 is comprised of three segments, an upper segment 80a adjacent the inner seal ring 62, an intermediate segment 80b spanning the intersection 44, and a lower segment 80c abutting the outer seal ring 64. The intermediate seal ring 80b includes an opening 90 therein which corresponds to that of the intersection 44. As shown in the enlarged view of FIG. 5, the sleeve segments 80a-c and the sleeve 78 are dimensioned so as to have slight clearance between both the plunger and the valve body bore, thus facilitating their removal upon opening of the aperture 88.

Closure means are provided for the aperture 88 which is removable to permit replacement of the seal rings. The closure means comprises in the illustrated embodiment a box-like housing 92 formed around the aperture and a removable panel 94 with a peripheral seal 96 which is demountably attached to the housing by latch members 98 carried by studs 100 extending from the housing as shown particularly in FIG. 7.

Means are provided to maintain the sleeve segment 80b adjacent the aperture in axial alignment with the plunger when the plunger is in the retracted position. Such means comprises a beveled joint 103 between the sleeve segments 80b and 80c, which joint is exposed to the aperture 88 as shown in FIG. 4. A filler block 104 shown in the enlarged view of FIG. 10 is disposed as shown in FIG. 7 between the cover plate 94 and the sleeve segment 80b. The filler block 104 prevents product residue accumulation in the aperture space and also serves to maintain the axial alignment of the sleeve segment 80b.

Means are also provided to maintain the sleeve segment 80b with its opening 90 in circumferential alignment with the intersection 44. This latter means comprises a boss 106 extending radially outwardly from the sleeve segment 80b which is received in a bore 108 of the filler block 104 to accurately align the sleeve segment and prevent its rotation in use. The boss 106 is internally threaded and serves a second purpose in permitting attachment of an extraction tool 110 as shown in FIG. 6 which is connected to the sleeve segment after the aperture has been opened.

For utilization of the invention to replace the valve seal rings, the plunger is retracted to a maintenance position 112 as shown in FIGS. 3 and 6 by removing the stops 86 from the yoke. The plunger stroke from a closed position to the maintenance position is shown as distance $S_m$ in FIG. 3. In the maintenance position, the plunger is sufficiently retracted to permit access to all of the sleeve segments and outer seal rings. The nuts 76 on the studs 56 are lowered a sufficient degree to release the gland force on the seal rings and sleeve segments as shown in FIG. 6.

With the plunger retracted to the maintenance position and the gland force released, the closure means of the aperture is removed. Specifically, the nuts 102 are removed to permit removal of the latches 98 from the studs 100 and the removal of the closure panel 94 from the housing 92. The filler block 104 is then removed from the housing and the tool 110 screwed into the threaded boss 106 of sleeve segment 80b to facilitate the removal of the segment. As shown in FIG. 6, the release of the gland biasing force has permitted the seal rings and sleeve segments to drop downwardly in the valve body bore, thus aligning the sleeve segment 80b with the aperture 88, separating the beveled joint 103 and permitting removal of the segment as illustrated in FIG. 6. Although in theory these segments and seal rings should slide easily into position opposite the aperture 88 for removal, in practice this movement may take some persuasion, hence the need for the tool 110 and threaded boss 106 to assist in the movement and removal of the initial sleeve segment.

Following replacement of the seal rings, the sleeve segments are returned to the valve body, the segment 80b being the last one replaced. The closure means is then reassembled to seal the valve body, and the nuts 76 tightened to restore the gland force on the seal rings. Following return of the plunger to its normal operating range, the stops 86 are replaced on the yoke and the valve is again ready for service.

Manifestly, changes in details of construction can be effected by those skilled in the art without departing from the invention.

We claim:

1. In a seatless high pressure valve comprising a cylindrical valve body, said valve body being open at one end and adapted for connection at said end to a pressure vessel, a cylindrical branch portion intersecting said valve body, the intersection of said branch portion and valve body being spaced from said valve body open end, a substantially cylindrical plunger disposed within said valve body, means for selectively moving said plunger from a closed position with the end thereof proximate said one end of said valve body to an open position with the end thereof spaced beyond said intersection from said valve body end, a first resilient seal ring disposed within said valve body between said valve body end and said intersection, said first seal ring encircling said plunger in the closed position of said plunger, means preventing movement of said first seal ring toward said valve body end, a second resilient seal ring in said valve body disposed on the opposite side of said intersection from said first seal ring and spaced from said intersection so as to encircle said plunger in both the open and closed positions of said plunger, gland means in said body portion in biasing engagement with said second seal ring to maintain said second seal ring in sealing engagement with said plunger and body portion and a cylindrical sleeve disposed within said body portion and bearing at one end against said first seal ring and at the other end against said second seal ring, said sleeve transmitting the biasing force of said gland means to said first seal ring to provide a sealing engagement of said first seal ring with said valve body and said plunger when said plunger is in the closed position, the improvement comprising;

an aperture in said valve body between said first and second seal rings, said aperture extending circumferentially at least 180° around said valve body, demountable closure means for closing said valve body aperture, said sleeve comprising a plurality of separable sleeve segments each having an axial dimension smaller than that of said aperture, one of said sleeve segments being substantially in alignment with said aperture, whereby upon the movement of said plunger to a maintenance position clear of said sleeve segments and second seal ring, the release of the biasing force of said gland means and the removal of said aperture closure means, said one sleeve segment can be removed from said valve body through said aperture following which the other sleeve segments can be moved into alignment with said aperture so that they can also be removed from said valve body through said aperture to permit the removal and replacement of said first and second seal rings.

2. The invention claimed in claim 1, including a third resilient seal ring disposed between said second ring and said intersection, and an additional sleeve segment disposed between said second and third seal rings and adapted to fit through said aperture to permit removal thereof from said valve body during seal ring replacement.

3. The invention claimed in claim 1, wherein said aperture is disposed substantially diametrically opposite said intersection.

4. The invention claimed in claim 3, wherein said aperture has an axial dimension greater than that of said intersection, and wherein a single sleeve segment extends across said intersection, said single sleeve segment having an opening therein aligned with and corresponding in shape to said intersection.

5. The invention claimed in claim 4, including means for maintaining said single sleeve segment in axial alignment with said plunger.

6. The invention claimed in claim 5, wherein said means for maintaining said single sleeve segment in axial alignment with said plunger comprises a beveled joint between said sleeve segment and an adjoining sleeve segment.

7. The invention as claimed in claim 6, wherein said means for maintaining said single sleeve segment in axial alignment with said plunger comprises a filler block closing said aperture and engaging said single sleeve segment.

8. The invention claimed in claim 7, including means for maintaining said single sleeve segment with the opening thereof in alignment with said intersection.

9. The invention claimed in claim 8, wherein said latter means comprises a boss on said single sleeve segment, and a corresponding bore in said filler block for receiving said boss and preventing rotation of said sleeve segment.

10. The invention as claimed in claim 9, wherein said boss is threaded for attachment of a tool to facilitate removal of said sleeve segment from said valve body.

11. The invention as claimed in claim 1, wherein said closure means comprises a box-like housing surrounding said aperture, and a demountable panel on said housing.

12. In a seatless high pressure valve comprising a cylindrical valve body, said valve body being open at one end and adapted for connection at said end to a pressure vessel, a cylindrical branch portion intersecting said valve body, the intersection of said branch portion and valve body being spaced from said valve body open end, a substantially cylindrical plunger disposed within said valve body, means for selectively moving said plunger from a closed position with the end thereof proximate said one end of said valve body to an open position with the end thereof spaced beyond said intersection from said valve body end, a first resilient seal ring disposed within said valve body between said valve body end and said intersection, said first seal ring encircling said plunger in the closed position of said plunger, means preventing movement of said first seal ring toward said valve body end, a second resilient seal ring in said valve body disposed on the opposite side of said intersection from said first seal ring and spaced from said intersection so as to encircle said plunger in both the open and closed positions of said plunger, gland means in said body portion in biasing engagement with said second seal ring to maintain said ring in sealing engagement with said plunger and body portion, and a cylindrical sleeve disposed within said body portion and bearing at one end against said first seal ring and at the other end against said second seal ring, said sleeve transmitting the biasing force of said gland means to said first seal ring to provide a sealing engagement of said first seal ring with said valve body and said plunger when said plunger is in the closed position, the improvement comprising;

an aperture in said valve body between said first and second seal rings, said aperture extending circumferentially at least 180° around said valve body and having an axial dimension greater than that of said intersection, demountable closure means for closing said valve body aperture, said sleeve comprising a plurality of separable sleeve segments each having an axial dimension smaller than that of said aperture, a single sleeve segment extending across said intersection and having an opening therein aligned with and corresponding to said intersection means for maintaining said single sleeve segment in axial alignment with said plunger, and means for maintaining said single sleeve segment with the opening thereof in alignment with said intersection, whereby upon the movement of said plunger to a maintenance position clear of said sleeve segments and second seal ring, the release of the biasing force of said gland means and the removal of said aperture closure, said single sleeve segment can be removed from said valve body through said aperture following which the other sleeve segments can be moved into alignment with said aperture so that they can also be removed from said valve body through said aperture to permit the removal and replacement of said first and second seal rings.

13. The invention as claimed in claim 12, including a third resilient seal ring disposed between said second ring and said intersection, and an additional sleeve segment disposed between said second and third seal rings and adapted to fit through said aperture to permit removal thereof from said valve body during seal ring replacement.

14. The invention as claimed in claim 13, wherein said means for maintaining said single sleeve segment in axial alignment with said plunger comprises a beveled joint between said sleeve segment and an adjoining sleeve segment.

15. The invention as claimed in claim 14, wherein said means for maintaining said single sleeve segment in axial alignment with said plunger comprises a filler block closing said aperture and engaging said single sleeve segment.

16. The invention as claimed in claim 12, wherein said means comprises a boss on said single sleeve segment, and a corresponding bore in said filler block for receiving said boss and preventing rotation of said sleeve segment.

17. The invention as claimed in claim 16, wherein said boss is threaded for attachment of a tool to facilitate removal of said sleeve segment from said valve body.

18. The invention as claimed in claim 12, wherein said closure means comprises a box-like housing surrounding said aperture, and a demountable panel on said housing.

* * * * *